(12) United States Patent
Cariou et al.

(10) Patent No.: US 10,979,107 B2
(45) Date of Patent: Apr. 13, 2021

(54) TRIGGER FRAME DESIGN FOR SHORT FEEDBACK

(71) Applicant: Intel IP Corporation, Santa Clara, CA (US)

(72) Inventors: Laurent Cariou, Portland, OR (US); Robert J. Stacey, Portland, OR (US)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/739,433

(22) Filed: Jan. 10, 2020

(65) Prior Publication Data

US 2020/0177245 A1     Jun. 4, 2020

Related U.S. Application Data

(63) Continuation of application No. 15/628,790, filed on Jun. 21, 2017, now Pat. No. 10,547,357.

(60) Provisional application No. 62/375,510, filed on Aug. 16, 2016.

(51) Int. Cl.
*H04B 7/04* (2017.01)
*H04B 7/0417* (2017.01)
*H04B 7/26* (2006.01)
*H04B 7/0452* (2017.01)

(52) U.S. Cl.
CPC ......... *H04B 7/0417* (2013.01); *H04B 7/2612* (2013.01); *H04B 7/0452* (2013.01)

(58) Field of Classification Search
CPC .......................... H04B 7/2612; H04B 7/0452
See application file for complete search history.

(56) References Cited

U.S. PATENT DOCUMENTS 10,547,357 B2    1/2020  Cariou et al.
2018/0054240 A1  2/2018  Cariou et al.

OTHER PUBLICATIONS

U.S. Appl. No. 15/628,790, U.S. Pat. No. 10,547,357, filed Jun. 21, 2017, Trigger Frame Design for Short Feedback.
"U.S. Appl. No. 15/628,790, Non Final Office Action dated May 31, 2019", 4 pgs.
"U.S. Appl. No. 15/628,790, Notice of Allowance dated Sep. 23, 2019", 5 pgs.
"U.S. Appl. No. 15/628,790, Response filed Aug. 30, 2019 to Non-Final Office Action dated May 31, 2019", 8 pgs.

*Primary Examiner* — Graham P Smith
(74) *Attorney, Agent, or Firm* — Schwegman Lundberg Woessner, P.A.

(57) ABSTRACT

Methods and apparatus are described by which a wireless station transmits information to an access point in response to a short feedback request. The response to the short feedback request is transmitted as either energy or lack thereof in one or more long training fields transmitted in a preamble of a physical layer packet. Short feedback trigger frames for requesting the short feedback are also described.

20 Claims, 11 Drawing Sheets

Fig. 8

| FRAME CONTROL | DURATION | RA | TA | COMMON INFO | PER USER INFO | ... | PER USER INFO | PADDING | FCS |
|---|---|---|---|---|---|---|---|---|---|
| 2 | 2 | 6 | 6 | TBD | TBD | | TBD | TBD | 4 |

BITS:

| LENGTH | CASCADE INDICATION | CS REQUIRED | SPATIAL REUSE | BW | CP AND LTF TYPE | MU MIMO LTF MODE | # OF LTFs |
|---|---|---|---|---|---|---|---|
| 12 | 1 | 1 | >=2 | TBD | TBD | 1 | 3 |

| STBC | LDPC EXTRA SYMBOL | AP TX POWER | PACKET EXTENSION | TRIGGER TYPE | TYPE-DEPENDENT COMMON INFO |
|---|---|---|---|---|---|
| 1 | 1 | TBD | >=3 | 4 | VARIABLE |

BITS:

B1

| USER IDENTIFIER | RU ALLOCATION | CODING TYPE | MCS | DCM | SS ALLOCATION | TARGET RSSI | TYPE DEPENDENT PER USER INFO |
|---|---|---|---|---|---|---|---|
| 12 | 8 | 1 | 4 | 1 | TBD | TBD | VARIABLE |

BITS:

*Fig. 10*

HE-LTF SEQUENCES

|  |  |  | #1 | #2 | #3 | #4 |
|---|---|---|---|---|---|---|
| | SS4 | RBID1 | HE-LTF | -HE-LTF | HE-LTF | HE-LTF |
| | SS3 | RBID2 | HE-LTF | HE-LTF | -HE-LTF | HE-LTF |
| | SS2 | RBID3 | HE-LTF | HE-LTF | HE-LTF | -HE-LTF |
| RU1 | SS1 | RBID4 | -HE-LTF | HE-LTF | HE-LTF | HE-LTF |
| | SS4 | RBID5 | HE-LTF | -HE-LTF | HE-LTF | HE-LTF |
| | SS3 | RBID6 | HE-LTF | HE-LTF | -HE-LTF | HE-LTF |
| | SS2 | RBID7 | HE-LTF | HE-LTF | HE-LTF | -HE-LTF |
| RU2 | SS1 | RBID8 | -HE-LTF | HE-LTF | HE-LTF | HE-LTF |

⋮

|  |  |  | #1 | #2 | #3 | #4 |
|---|---|---|---|---|---|---|
| | SS4 | RBID33 | HE-LTF | -HE-LTF | HE-LTF | HE-LTF |
| | SS3 | RBID34 | HE-LTF | HE-LTF | -HE-LTF | HE-LTF |
| | SS2 | RBID35 | HE-LTF | HE-LTF | HE-LTF | -HE-LTF |
| RU9 | SS1 | RBID36 | -HE-LTF | HE-LTF | HE-LTF | HE-LTF |

Fig. 11

| FRAME CONTROL | DURATION | RA | TA | COMMON INFO | PER RBID-SET INFO | ... | PER RBID-SET INFO | PADDING | FCS |
|---|---|---|---|---|---|---|---|---|---|
| 2 | 2 | 6 | 6 | TBD | TBD | | TBD | TBD | 4 |

Fig. 12

| LENGTH | CASCADE INDICATION | CS REQUIRED | SPATIAL REUSE | BW | CP AND LTF TYPE | MU MIMO LTF MODE | # OF LTFs |
|---|---|---|---|---|---|---|---|
| 12 | 1 | 1 | >=2 | TBD | TBD | 1 | 3 |

| STBC | LDPC EXTRA SYMBOL | AP TX POWER | PACKET EXTENSION | TRIGGER TYPE SET TO SHORT FEEDBACK | TYPE-DEPENDENT COMMON INFO |
|---|---|---|---|---|---|
| 1 | 1 | TBD | >=3 | 4 | VARIABLE |

Fig. 13

| RU SIZE | NSS | Nb OF CONSECUTIVE HE-LTF FEEDBACKS FIELDS | ROTATION VALUE | Nb BITS OF FEEDBACK | FEEDBACK TYPE (RESOURCE REQUEST, PS-POLL LOCATION SERVICE REQUEST, AVAILABILITY FOR Rx AVAILABILITY FOR Tx) | GROUP ID (SPECIFIC VALUE MEANS ALL STAs CAN PARTICIPATE) | ASSIGNED RBIDs OR RANDOM SELECTION OF RBIDs |
|---|---|---|---|---|---|---|---|
| BITS: TBD | TBD | TBD | TBD | TBD | TBD | TBD | |

*Fig. 14*

| MIN RBID | MIN RBID | GROUP ID (SPECIFIC VALUE MEANS ALL STAs CAN PARTICIPATE) | ASSIGNED RBIDs OR RANDOM SELECTION OF RBIDs |
|---|---|---|---|
| BITS: TBD | TBD | TBD | TBD |

*Fig. 15*

TRIGGER FRAME DESIGN FOR SHORT FEEDBACK

PRIORITY CLAIM

This application is a continuation of U.S. patent application Ser. No. 15/628,790, filed Jun. 21, 2017, which claims priority to U.S. Provisional Patent Application Ser. No. 62/375,510 filed Aug. 16, 2016, each of which is incorporated herein by reference in their entirety

TECHNICAL FIELD

Embodiments described herein relate generally to wireless networks and communications systems.

BACKGROUND

Wireless networks as defined by the IEEE 802.11 specifications (sometimes referred to as Wi-Fi) are currently being advanced to provide much greater average throughput per user to serve future communications needs. The IEEE 802.11 ax standard as presently proposed incorporates features that include, for example, downlink and uplink multiuser (MU) operation by means of orthogonal frequency division multiple access (OFDMA) and multi-user multiple-input-multiple-output (MU-MIMO) technologies.

BRIEF DESCRIPTION OF THE DRAWINGS

FIG. 8 shows the format of a MAC trigger frame according to some embodiments.

FIG. 9 shows an example of a common information field according to some embodiments.

FIG. 10 shows an example of a per user information field according to some embodiments.

FIG. 11 illustrates an example resource block configuration for short feedback according to some embodiments.

FIG. 12 illustrates an example MAC frame for triggering short feedback according to some embodiments.

FIG. 13 illustrates a common information field of the MAC frame for triggering short feedback according to some embodiments.

FIG. 14 illustrates a type dependent common information field of a MAC frame for triggering short feedback according to some embodiments.

FIG. 15 illustrates a per-RBIDs_set info field of a MAC frame for triggering short feedback according to some embodiments.

DETAILED DESCRIPTION

Described herein are methods and apparatus by which a wireless station (STA) transmits information to an access point in response to a short feedback request. The response to the short feedback request is transmitted as either energy or lack thereof in one or more long training fields transmitted in a preamble of a physical layer packet. Short feedback trigger frames for requesting the short feedback are also described.

Example Radio Architecture

Figure 1:
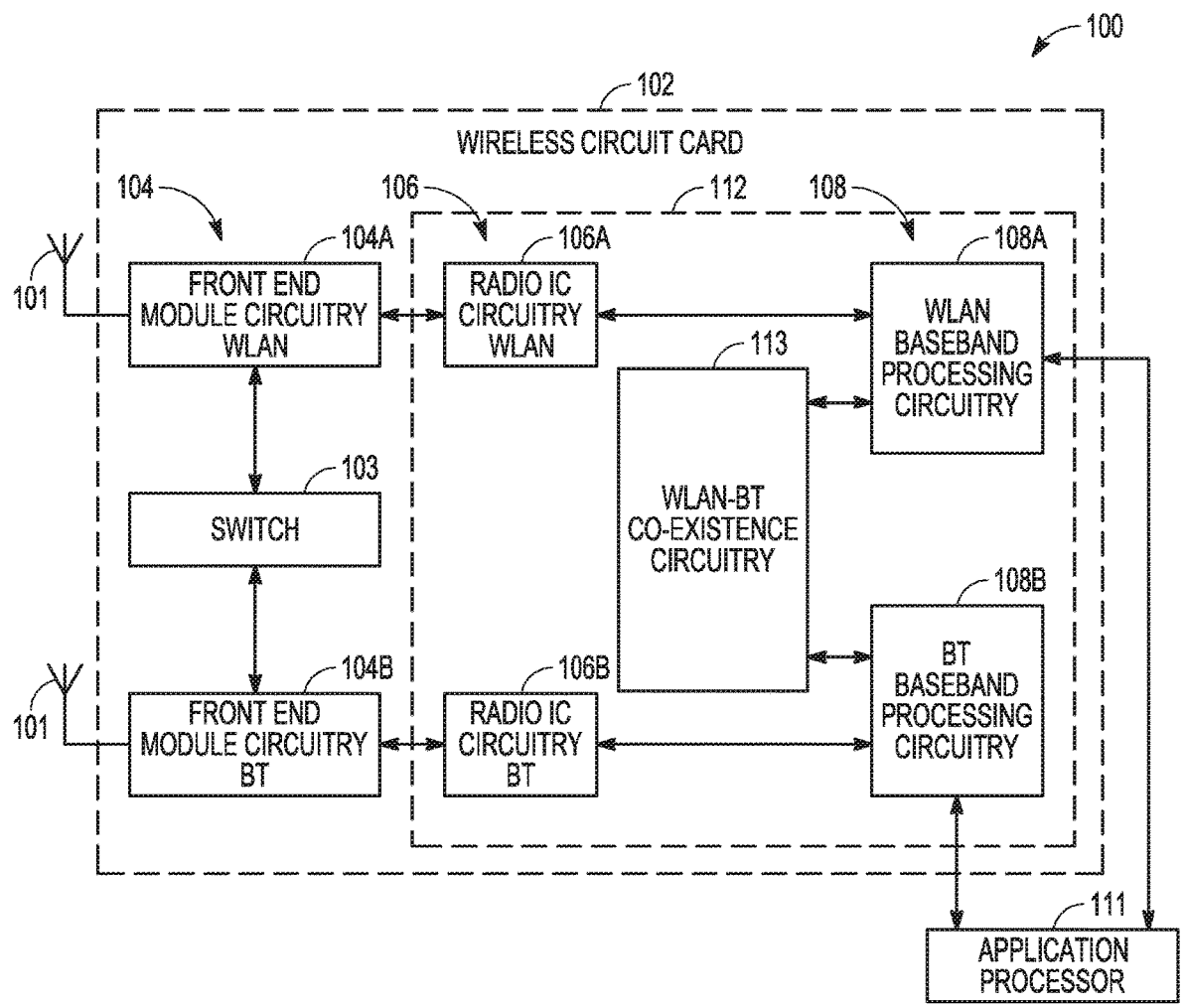
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104a and a Bluetooth (BT) FEM circuitry 104b. The WLAN FEM circuitry 104a may include a receive signal path comprising circuitry configured to operate on WLAN RF signals received from one or more antennas 101, to amplify the received signals and to provide the amplified versions of the received signals to the WLAN radio IC circuitry 106a for further processing. The BT FEM circuitry 104b may include a receive signal path which may include circuitry configured to operate on BT RF signals received from one or more antennas 102, to amplify the received signals and to provide the amplified versions of the received signals to the BT radio IC circuitry 106b for further processing. FEM circuitry 104a may also include a transmit signal path which may include circuitry configured to amplify WLAN signals provided by the radio IC circuitry 106a for wireless transmission by one or more of the antennas 101. In addition, FEM circuitry 104b may also include a transmit signal path which may include circuitry configured to amplify BT signals provided by the radio IC circuitry 106b for wireless transmission by the one or more antennas. In the embodiment of FIG. 1, although FEM 104a and FEM 104b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106a and BT radio IC circuitry 106b. The WLAN radio IC circuitry 106a may include a receive signal path which may include circuitry to down-convert WLAN RF signals received from the FEM circuitry 104a and provide baseband signals to WLAN baseband processing circuitry 108a. BT radio IC circuitry 106b may in turn include a receive signal path which may include circuitry to down-convert BT RF signals received from the FEM circuitry 104b and provide baseband signals to BT baseband processing circuitry 108b. WLAN radio IC circuitry 106a may also include a transmit signal path which may include circuitry to up-convert WLAN baseband signals provided by the WLAN baseband processing circuitry 108a and provide WLAN RF output signals to the FEM circuitry 104a for subsequent wireless transmission by the one or more antennas 101. BT radio IC circuitry 106b may also include a transmit signal path which may include circuitry to up-convert BT baseband signals provided by the BT baseband processing circuitry 108b and provide BT RF output signals to the FEM circuitry 104b for subsequent wireless transmission by the one or more antennas 101. In the embodiment of FIG. 1, although radio IC circuitries 106a and 106b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108a and a BT baseband processing circuitry 108b. The WLAN baseband processing circuitry 108a may include a memory, such as, for example, a set of RAM arrays in a Fast Fourier Transform or Inverse Fast Fourier Transform block (not shown) of the WLAN baseband processing circuitry 108a. Each of the WLAN baseband circuitry 108a and the BT baseband circuitry 108b may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108a and 108b may further include physical layer (PHY) and medium access control layer (MAC) circuitry, and may further interface with application processor 110 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108a and the BT baseband circuitry 108b to enable use cases requiring WLAN and BT coexistence. In addition, a switch 103 may be provided between the WLAN FEM circuitry 104a and the BT FEM circuitry 104b to allow switching between the WLAN and BT radios according to application needs. In addition, although the antennas 101 are depicted as being respectively connected to the WLAN FEM circuitry 104a and the BT FEM circuitry 104b, embodiments include within their scope the sharing of one or more antennas as between the WLAN and BT FEMs, or the provision of more than one antenna connected to each of FEM 104a or 104b.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, 802.11n-2009, IEEE 802.11-2012, 802.11n-2009, 802.11ac, and/or 802.11ax standards and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured for high-efficiency (HE) Wi-Fi (HEW) communications in accordance with the IEEE 802.11ax standard. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108b may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
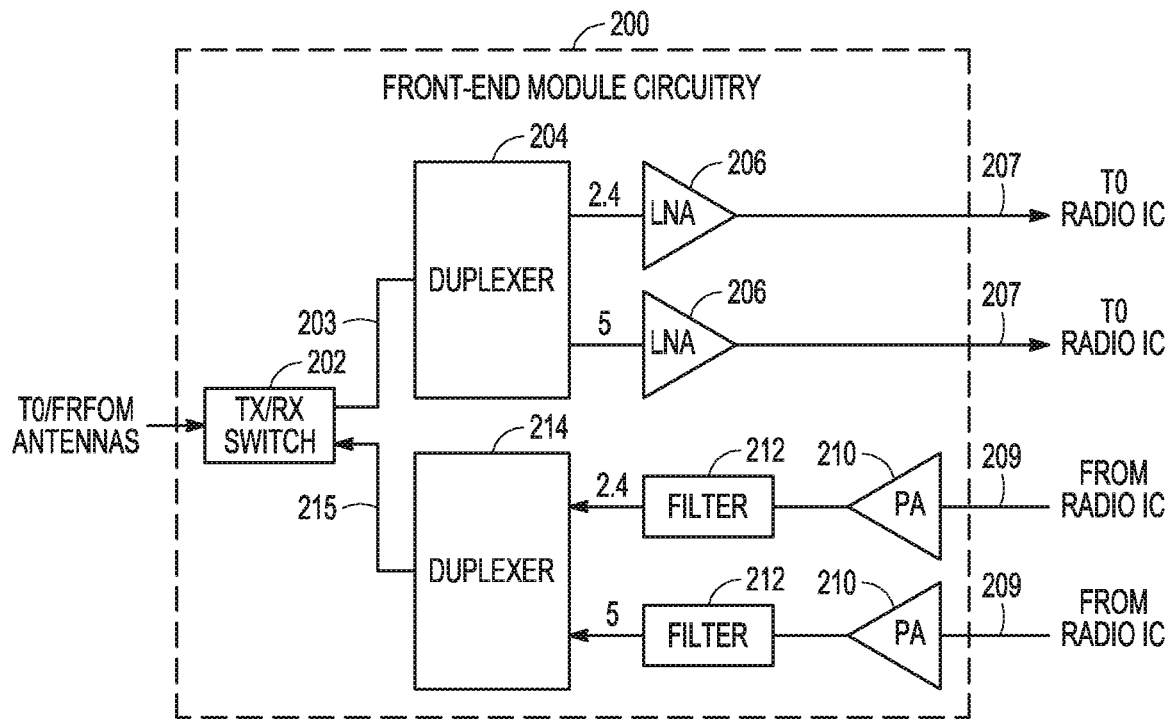
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104a/104b (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
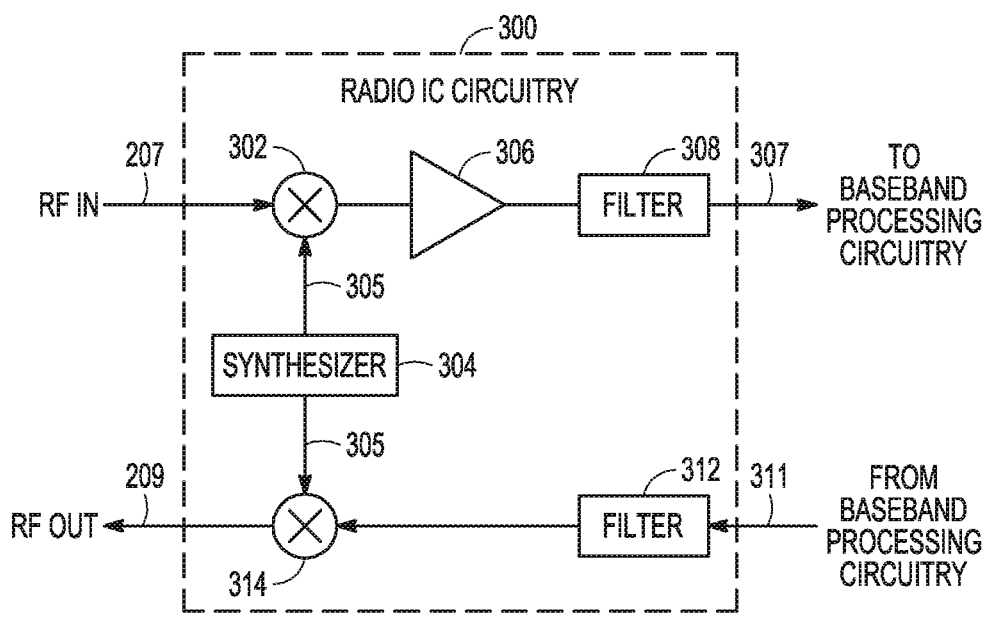
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106a/106b (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety degree time-varying LO switching signals provided by a quadrature circuitry which may be configured to receive a LO frequency (fLo) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 110 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 110.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency (fLO).

Figure 4:
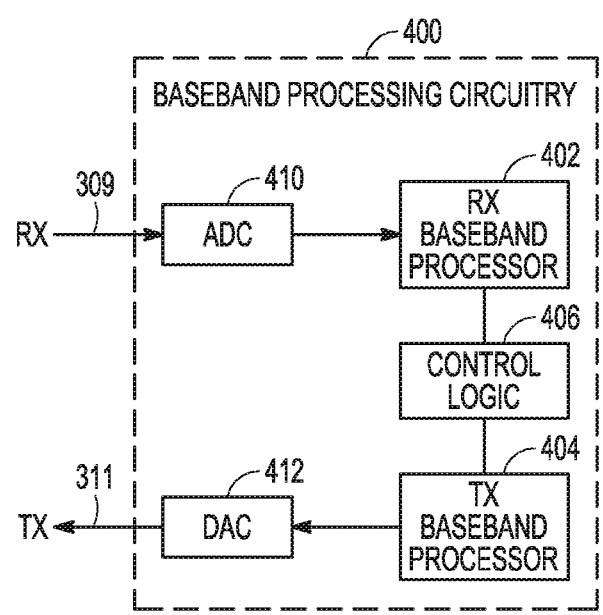
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108a, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example Machine Description

Figure 5:
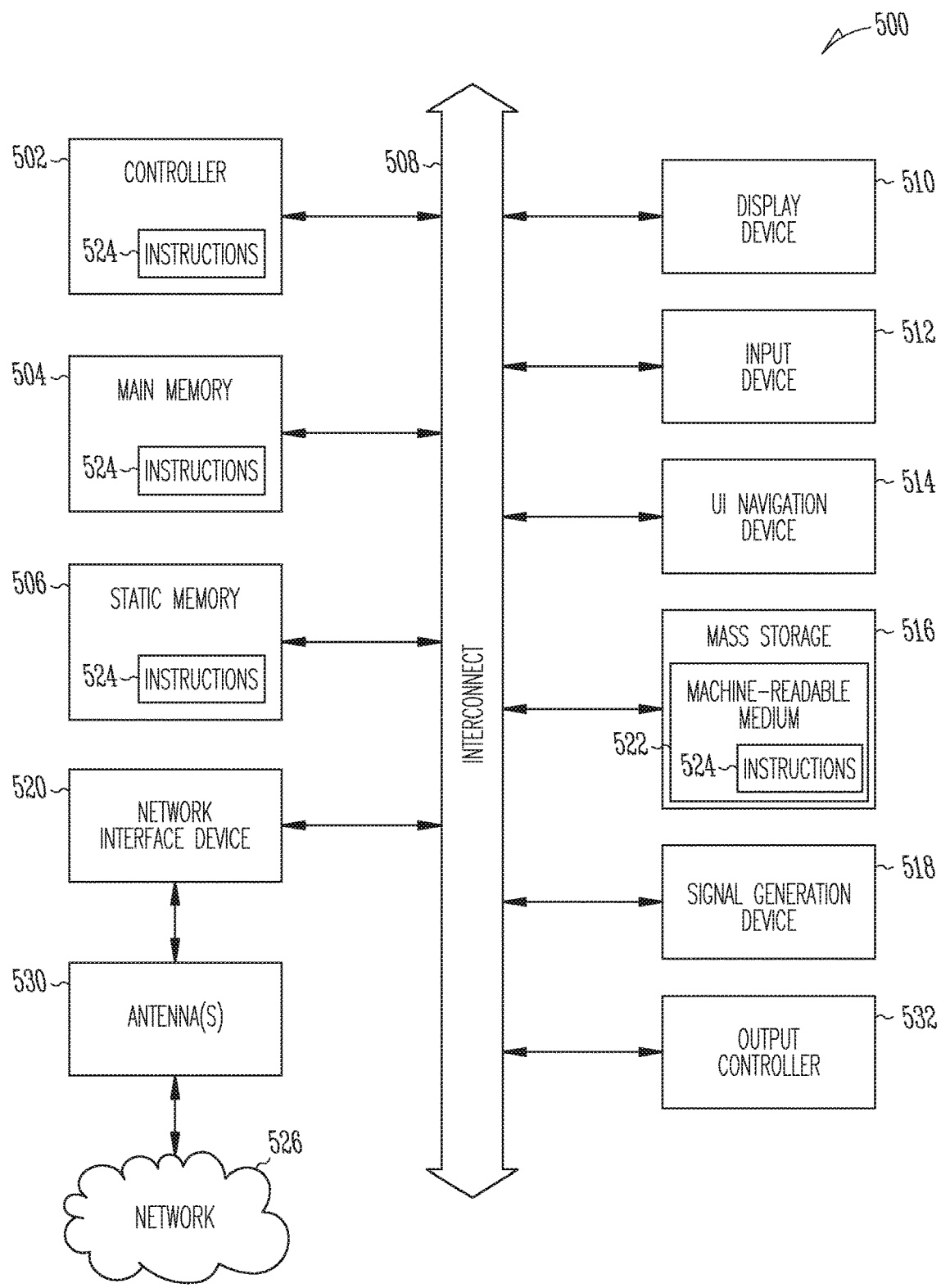
FIG. 5 illustrates an example of a computing machine according to some embodiments.

FIG. 5 illustrates a block diagram of an example machine 500 upon which any one or more of the techniques (e.g., methodologies) discussed herein may perform. In alternative embodiments, the machine 500 may operate as a standalone device or may be connected (e.g., networked) to other machines. In a networked deployment, the machine 500 may operate in the capacity of a server machine, a client machine, or both in server-client network environments. In an example, the machine 500 may act as a peer machine in peer-to-peer (P2P) (or other distributed) network environment. The machine 500 may be a user equipment (UE), evolved Node B (eNB), Wi-Fi access point (AP), Wi-Fi station (STA), personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 500 may include a hardware processor 502 (e.g., a central processing unit (CPU), a graphics processing unit (GPU), a hardware processor core, or any combination thereof), a main memory 504 and a static memory 506, some or all of which may communicate with each other via an interlink (e.g., bus) 508. The machine 500 may further include a display unit 510, an alphanumeric input device 512 (e.g., a keyboard), and a user interface (UI) navigation device 514 (e.g., a mouse). In an example, the display unit 510, input device 512 and UI navigation device 514 may be a touch screen display. The machine 500 may additionally include a storage device (e.g., drive unit) 516, a signal generation device 518 (e.g., a speaker), a network interface device 520, and one or more sensors 521, such as a global positioning system (GPS) sensor, compass, accelerometer, or other sensor. The machine 500 may include an output controller 528, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within static memory 506, or within the hardware processor 502 during execution thereof by the machine 500. In an example, one or any combination of the hardware processor 502, the main memory 504, the static memory 506, or the storage device 516 may constitute machine readable media.

While the machine readable medium 522 is illustrated as a single medium, the term "machine readable medium" may include a single medium or multiple media (e.g., a centralized or distributed database, and/or associated caches and servers) configured to store the one or more instructions 524.

The term "machine readable medium" may include any medium that is capable of storing, encoding, or carrying instructions for execution by the machine 500 and that cause the machine 500 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal.

The instructions 524 may further be transmitted or received over a communications network 526 using a transmission medium via the network interface device 520 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 520 may include one or more physical jacks (e.g., Ethernet, coaxial, or phone jacks) or one or more antennas to connect to the communications network 526. In an example, the network interface device 520 may include a plurality of antennas to wirelessly communicate using at least one of single-input multiple-output (SIMO), multiple-input multiple-output (MIMO), or multiple-input single-output (MISO) techniques. In some examples, the network interface device 520 may wirelessly communicate using Multiple User MIMO techniques. The term "transmission medium" shall be taken to include any intangible medium that is capable of storing, encoding, or carrying instructions for execution by the machine 500, and includes digital or analog communications signals or other intangible medium to facilitate communication of such software.

Example STA Description

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 6:
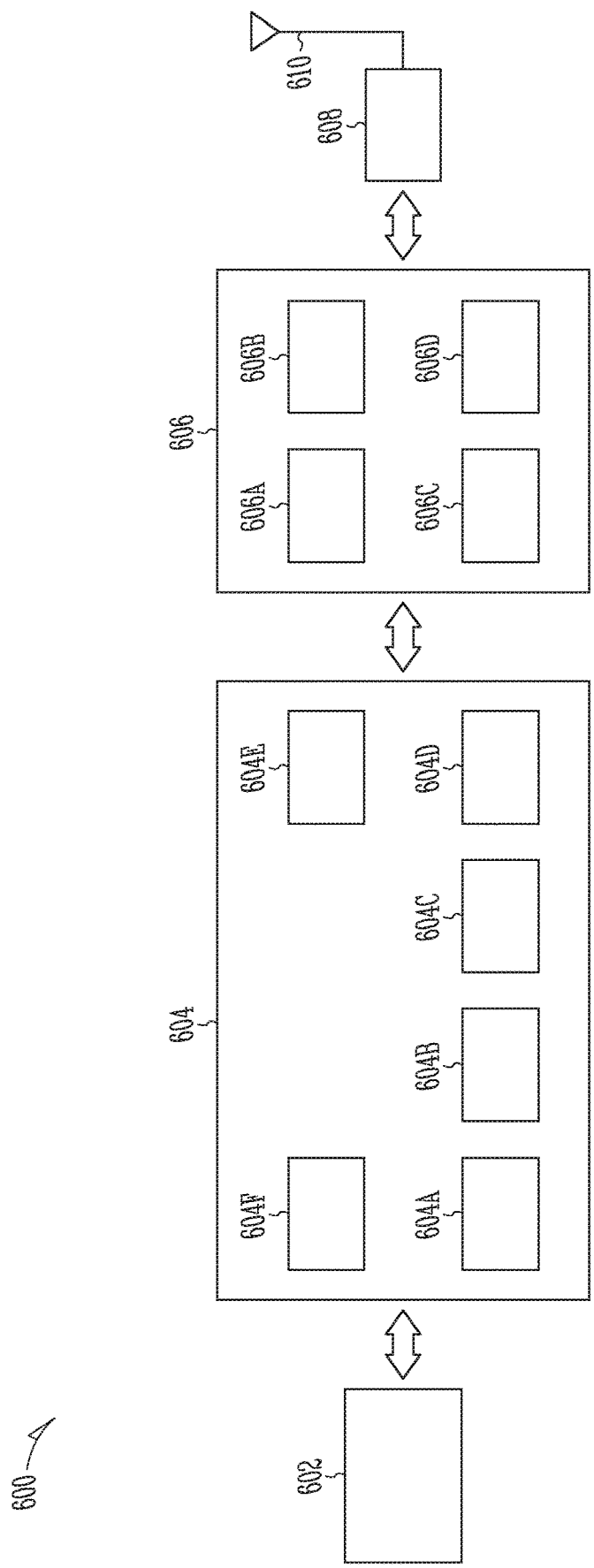
FIG. 6 illustrates an example of a wireless station device according to some embodiments.

Embodiments described herein may be implemented into a system using any suitably configured hardware and/or software. FIG. 6 illustrates, for one embodiment, example components of a STA or User Equipment (UE) device 600. In some embodiments, the STA device 600 may include application circuitry 602, baseband circuitry 604, Radio Frequency (RF) circuitry 606, front-end module (FEM) circuitry 608 and one or more antennas 610, coupled together at least as shown.

The application circuitry 602 may include one or more application processors. For example, the application circuitry 602 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 604 may include circuitry such as, but not limited to, one or more single-core or multi-core processors. The baseband circuitry 604 may include one or more baseband processors and/or control logic to process baseband signals received from a receive signal path of the RF circuitry 606 and to generate baseband signals for a transmit signal path of the RF circuitry 606. Baseband processing circuitry 604 may interface with the application circuitry 602 for generation and processing of the baseband signals and for controlling operations of the RF circuitry 606. For example, in some embodiments, the baseband circuitry 604 may include a second generation (2G) baseband processor 604a, third generation (3G) baseband processor 604b, fourth generation (4G) baseband processor 604c, and/or other baseband processor(s) 604d for other existing generations, generations in development or to be developed in the future (e.g., fifth generation (5G), 6G, etc.). The baseband circuitry 604 (e.g., one or more of baseband processors 604a-d) may handle various radio control functions that enable communication with one or more radio networks via the RF circuitry 606. The radio control functions may include, but are not limited to, signal modulation/demodulation, encoding/decoding, radio frequency shifting, etc. In some embodiments, modulation/demodulation circuitry of the baseband circuitry 604 may include Fast-Fourier Transform (FFT), precoding, and/or constellation mapping/demapping functionality. In some embodiments, encoding/decoding circuitry of the baseband circuitry 604 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 604 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 604e of the baseband circuitry 604 may be configured to run elements of the protocol stack for signaling of the PHY, MAC, RLC, PDCP and/or RRC layers. In some embodiments, the baseband circuitry may include one or more audio digital signal processor(s) (DSP) 604f. The audio DSP(s) 604f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 604 and the application circuitry 602 may be implemented together such as, for example, on a system on a chip (SOC).

In some embodiments, the baseband circuitry 604 may provide for communication compatible with one or more radio technologies. For example, in some embodiments, the baseband circuitry 604 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 604 is configured to support radio communications of more than one wireless protocol may be referred to as multi-mode baseband circuitry.

RF circuitry 606 may enable communication with wireless networks using modulated electromagnetic radiation through a non-solid medium. In various embodiments, the RF circuitry 606 may include switches, filters, amplifiers, etc. to facilitate the communication with the wireless network. RF circuitry 606 may include a receive signal path which may include circuitry to down-convert RF signals received from the FEM circuitry 608 and provide baseband signals to the baseband circuitry 604. RF circuitry 606 may also include a transmit signal path which may include circuitry to up-convert baseband signals provided by the baseband circuitry 604 and provide RF output signals to the FEM circuitry 608 for transmission.

In some embodiments, the RF circuitry 606 may include a receive signal path and a transmit signal path. The receive signal path of the RF circuitry 606 may include mixer circuitry 606a, amplifier circuitry 606b and filter circuitry 606c. The transmit signal path of the RF circuitry 606 may include filter circuitry 606c and mixer circuitry 606a. RF circuitry 606 may also include synthesizer circuitry 606d for synthesizing a frequency for use by the mixer circuitry 606a of the receive signal path and the transmit signal path. In some embodiments, the mixer circuitry 606a of the receive signal path may be configured to down-convert RF signals received from the FEM circuitry 608 based on the synthesized frequency provided by synthesizer circuitry 606d. The amplifier circuitry 606b may be configured to amplify the down-converted signals and the filter circuitry 606c may be a low-pass filter (LPF) or band-pass filter (BPF) configured to remove unwanted signals from the down-converted signals to generate output baseband signals. Output baseband signals may be provided to the baseband circuitry 604 for further processing. In some embodiments, the output baseband signals may be zero-frequency baseband signals, although this is not a requirement. In some embodiments, mixer circuitry 606a of the receive signal path may comprise passive mixers, although the scope of the embodiments is not limited in this respect.

In some embodiments, the mixer circuitry 606a of the transmit signal path may be configured to up-convert input baseband signals based on the synthesized frequency provided by the synthesizer circuitry 606d to generate RF output signals for the FEM circuitry 608. The baseband signals may be provided by the baseband circuitry 604 and may be filtered by filter circuitry 606c. The filter circuitry 606c may include a low-pass filter (LPF), although the scope of the embodiments is not limited in this respect.

In some embodiments, the mixer circuitry 606a of the receive signal path and the mixer circuitry 606a of the transmit signal path may include two or more mixers and may be arranged for quadrature downconversion and/or upconversion respectively. In some embodiments, the mixer circuitry 606a of the receive signal path and the mixer circuitry 606a of the transmit signal path may include two or more mixers and may be arranged for image rejection (e.g., Hartley image rejection). In some embodiments, the mixer circuitry 606a of the receive signal path and the mixer circuitry 606a may be arranged for direct downconversion and/or direct upconversion, respectively. In some embodiments, the mixer circuitry 606a of the receive signal path and the mixer circuitry 606a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 606 may include analog-to-digital converter (ADC) and digital-to-analog converter (DAC) circuitry and the baseband circuitry 604 may include a digital baseband interface to communicate with the RF circuitry 606.

In some dual-mode embodiments, a separate radio IC circuitry may be provided for processing signals for each spectrum, although the scope of the embodiments is not limited in this respect.

In some embodiments, the synthesizer circuitry 606d may be a fractional-N synthesizer or a fractional N/N+1 synthesizer, although the scope of the embodiments is not limited in this respect as other types of frequency synthesizers may be suitable. For example, synthesizer circuitry 606d may be a delta-sigma synthesizer, a frequency multiplier, or a synthesizer comprising a phase-locked loop with a frequency divider.

The synthesizer circuitry 606d may be configured to synthesize an output frequency for use by the mixer circuitry 606a of the RF circuitry 606 based on a frequency input and a divider control input. In some embodiments, the synthesizer circuitry 606d may be a fractional N/N+1 synthesizer.

In some embodiments, frequency input may be provided by a voltage controlled oscillator (VCO), although that is not a requirement. Divider control input may be provided by either the baseband circuitry 604 or the applications processor 602 depending on the desired output frequency. In some embodiments, a divider control input (e.g., N) may be determined from a look-up table based on a channel indicated by the applications processor 602.

Synthesizer circuitry 606d of the RF circuitry 606 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 606d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fio). In some embodiments, the RF circuitry 606 may include an IQ/polar converter.

FEM circuitry 608 may include a receive signal path which may include circuitry configured to operate on RF signals received from one or more antennas 610, amplify the received signals and provide the amplified versions of the received signals to the RF circuitry 606 for further processing. FEM circuitry 608 may also include a transmit signal path which may include circuitry configured to amplify signals for transmission provided by the RF circuitry 606 for transmission by one or more of the one or more antennas 610.

In some embodiments, the FEM circuitry 608 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 606). The transmit signal path of the FEM circuitry 608 may include a power amplifier (PA) to amplify input RF signals (e.g., provided by RF circuitry 606), and one or more filters to generate RF signals for subsequent transmission (e.g., by one or more of the one or more antennas 610.

In some embodiments, the UE device 600 may include additional elements such as, for example, memory/storage, display, camera, sensor, and/or input/output (I/O) interface.

Description of Embodiments

Figure 7:
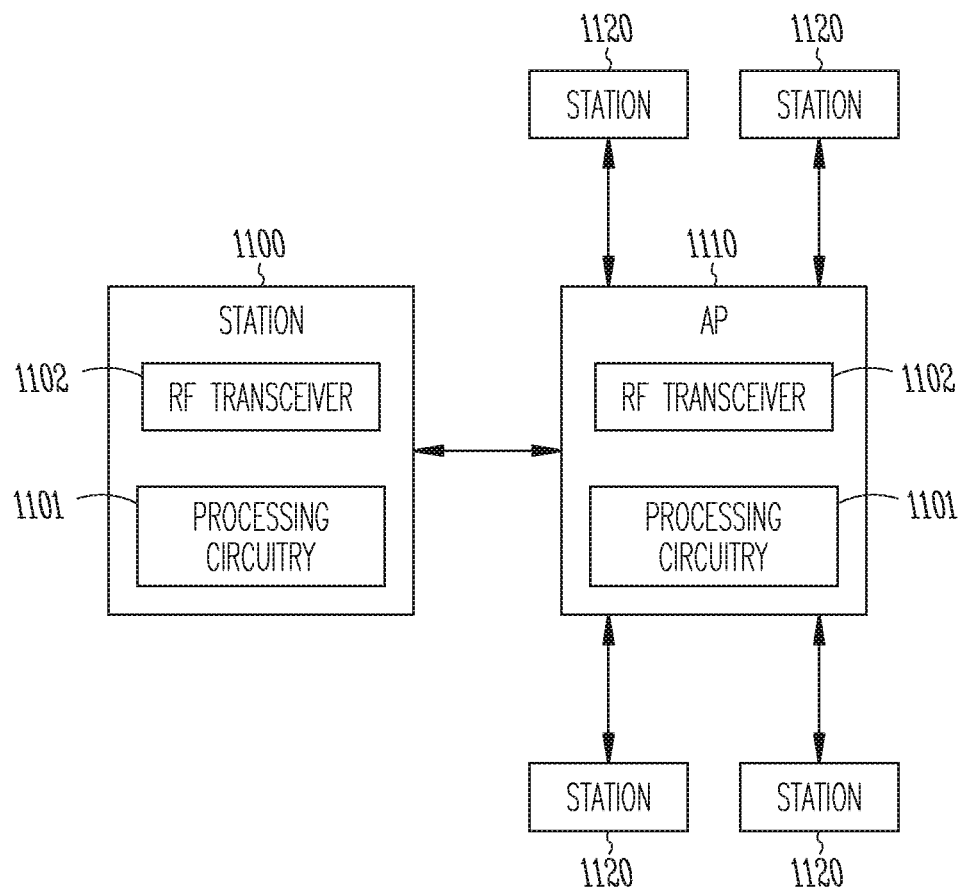
FIG. 7 illustrates a basic service set that includes station devices associated with an access point according to some embodiments.

In an 802.11 local area network (LAN), the entities that wirelessly communicate are referred to as stations (STAs). A basic service set (BSS) refers to a plurality of stations that remain within a certain coverage area and form some sort of association. In one form of association, the stations communicate directly with one another in an ad-hoc network. More typically, however, the stations associate with a central station dedicated to managing the BSS and referred to as an access point (AP). FIG. 7 illustrates a BSS that includes a station device 1100 associated with an access point (AP) 1110, where the AP 1110 may be associated with a number of other stations 1120. The device 1100 may be any type of device with functionality for connecting to a WiFi network such as a computer, smart phone, or a UE (user equipment) with WLAN access capability, the latter referring to terminals in a LTE (Long Term Evolution) network. Each of the station devices include an RF (radio frequency transceiver) 1102 and processing circuitry 1101 as shown by the depictions of devices 1100 and 1110. The processing circuitry includes the functionalities for WiFi network access via the RF transceiver as well as functionalities for processing as described herein. The RF transceivers of the station device 1100 and access point 1110 may each incorporate one or more antennas. The RF transceiver 1100 with multiple antennas and processing circuitry 101 may implement one or more MIMO (multi-input multi-output) techniques such as spatial multiplexing, transmit/receive diversity, and beam forming. The devices 1100 and 1110 are representative of the wireless access points and stations described below.

The 802.11 ax standard provides for downlink (DL) and uplink (UL) multi-user (MU) operation. Multiple simultaneous transmissions to different STAs from the AP in the DL and from multiple STAs to the AP in the UL are enabled via MU-MIMO and/or orthogonal frequency division multiple access (OFDMA). With OFDMA, the AP assigns separate subsets of OFDMA subcarriers, referred to as resource units (RUs), to individual STAs for UL and DL transmissions. With MU-MIMO, multiple antenna beamforming techniques are used to form spatial streams (SSs) that the AP assigns to STAs for UL and DL transmissions.

In an 802.11 WLAN network, the stations communicate via a layered protocol that includes a physical layer (PHY) and a medium access control (MAC) layer. The MAC layer is a set of rules that determine how to access the medium in order to send and receive data, and the details of transmission and reception are left to the PHY layer. At the MAC layer, transmissions in an 802.11 network are in the form of MAC frames of which there are three main types: data frames, control frames, and management frames. In 802.11ax systems, a type of MAC control frame referred to as a trigger frame is used by the AP to elicit responses from multiple STAs. Such trigger frames may be used to initiate MU DL or MU UL transmissions. For example, a MU request-to-send (RTS) frame may initiate clear-to-send (CTS) responses from multiple STAs and subsequent transmission of DL data to those STAs. FIG. 8 shows the format of an example MU trigger frame 80 according to some embodiments. The MAC frame includes fields for frame control, duration, receive address (RA), transmit address (TA), padding, and a frame check sequence (FCS). The MAC frame also includes a common information field (Common Info) and one or more per user information fields (Per User Info). FIG. 9 illustrates the Common Info field 81 that includes a long training field (LTF) type field, a number of LTFs field, a trigger type field, and a Type-dependent Common Info field. FIG. 10 illustrates the Per User Info field 82 that includes a Type-dependent Per User field. In each of the figures the number of bits are given for each sub-field or it is designated as to be determined (TBD) according to the current specifications.

MAC frames are carried by PHY layer packets that include a preamble. The 802.11 ax standard provides an HE-LTF (high-efficiency long training field) as part of the preamble that is used for MIMO channel estimation. HE-LTFs are transmitted in all spatial streams (SSs) and orthogonalized by a spreading code in the time domain that corresponds to a row of a matrix referred to as a P-matrix. In what is referred to herein as short feedback, a STA is assigned a specific orthogonal allocation referred to as a resource block (RB) on the HE-LTF dimensions that define a specific RU in the frequency domain and a specific P-matrix spreading code in the time domain. That is, each STA is uniquely assigned an RB defined by a particular spatial stream (SS) that corresponds to a row of the P-matrix and by a particular RU where an RU may be made up, for example, of 26 tones or subcarriers. A STA may thus identify itself to the AP by transmitting a signal using the assigned RB. To initiate short feedback, the AP sends a type of trigger frame that asks a specific question of the STAs that receive the frame. Such questions could relate, for example, to whether the STA is awake in case the AP has buffered DL data to send or to whether the STA has UL to send. In response to the trigger frame, STAs may then respond by sending an UL MU-NDP (null data packet) with energy in the HE-LTF to the AP on their assigned RB. The transmission of this signal may then be understood by the AP as being a positive answer (i.e., if energy is detected) to the question and the ID of the STA is known by the RB in which energy is detected. The AP can then send an acknowledgement to the STA to indicate that it received the answer. The acknowledgement may be in the form of a multi-user block acknowledgement (M-BA) to acknowledge multiple STAs.

FIG. 11 shows an example of an RB allocation for short feedback in which there are nine RUs, each RU comprising 26 tones or subcarriers, and four spatial streams where each spatial stream corresponds to a MIMO channel. Each STA that is to participate in the short feedback procedure is allocated a resource block identification (RBID) that corresponds to an RB defined by a particular RU and a particular spatial stream, where the latter corresponds to a row of the P-matrix used to time-spread the HE-LTF symbols. To provide orthogonality, the length of a P-matrix row is equal or greater than the number of spatial streams. As a result of the time-spreading, four HE-LTF symbols (i.e., sequences) are transmitted by a STA responding to the short-feedback request in the PHY frame preamble where each HE-LTF is multiplied by 1 or −1 according to the P-matrix. In the illustrated example, there are nine 26-tone RUs and four spatial streams to result in a total of 36 available. A greater number of available RBs may be provided in cases where there are more RUs in the system bandwidth and/or more spatial streams available. The number of available RBs may also be increased by defining a RU to contain fewer subcarriers.

Described herein is a new type of trigger frame for soliciting short feedback from STAs with UL MU NDPs in order to provide full flexibility for the different types of feedbacks that may be transmitted by the STAs. The common info field and per user info fields of a trigger frame for short feedback with UL MU NDP (referred to as a short feedback trigger frame) may include information relating to: 1) the types of feedbacks that will be requested, 2) the identification of the STAs that can answer, 3) the RB allocations, and/or 4) whether the RB allocations are assigned or randomly selected. In one embodiment, an entry in the "trigger type" subfield of the common info field in the trigger frame format is used to designate the trigger frame as being for short feedback with UL MU NDP. Various embodiments for including these and other types of information are described below that may be employed alone or in combination.

FIG. 12 illustrates an example of a MAC frame 90 for triggering short feedback that includes per RBID set info fields in place of per user info fields and a common info field. FIG. 13 illustrates an example of the common info field 91 that includes a trigger type field set to short feedback and a type-dependent common info field. In one embodiment, as illustrated by FIG. 14, the type-dependent common info field 92 of the common info field of the short feedback trigger frame includes information relating to the parameters of the UL MU NDP feedbacks. Such parameters may include: 1) the RU size of the RBs; 2) an NSS parameter indicating the number of spatial steams for the RB design where a Max-NSS parameter may specify the maximum number of such spatial streams; 3) the number of HE-LTF feedback fields consecutive in time and carrying different feedbacks with each of the HE-LTF fields comprising NSS HE-LTF symbols. Optionally, the trigger frame may include a rotation value to enable rotation of RBIDs to STAs so that STAs with assigned RBIDs may use other RBIDs in responding to the short feedback request. For example, STAs that have an assigned RBID can find their effective RBID in response to a particular trigger based on this rotation value and their assigned RBID with a specific defined equation.

In one embodiment, as also shown by FIG. 14, the type-dependent common info field of a short feedback trigger frame includes information relating to the content that will be fed back by the STAs in each of the UL MU NDP feedback fields such as the number of bits of the feedback. For example, with N bit feedback, there would be N consecutive HE-LTFs fields in the feedback. The information may also include the type of the feedback such as a resource request, a PS-poll where a STA in power save (PS) mode polls the AP to determine if has buffered DL traffic for the STA, or a location service measurement request.

In one embodiment, also as shown by FIG. 14, the common info field of a short feedback trigger frame includes information relating to which STAs can participate in the UL MU NDP response. For example, it may be specified that, by default, all STAs can participate if they have an assigned RBID. To enable a possible limitation to a specific group of STAs, a field indicating that only a specific group of STAs can participate in the UL MU NDP short feedback. For example, an RBID_groupID field may designate a particular group identification (ID) so that only STAs that have been allocated with that group identification will respond with short feedback. A default specific entry of this field may be used to indicate that all STAs can participate. Optionally, there may be a field indicating if the RBIDs can be randomly selected or if the RBIDs can only be used by STAs that have been assigned an RBID by the AP in a previous management frame exchange.

In another embodiment, enhanced trigger frame parameters may be provided for multiple sets of RBIDs. It may be desirable to allow different sets of RBIDs among all the RBIDs available in the occupied bandwidth to be used in different manners such as different sets of RBIDs being assigned to different group of STAs, each with a specific groupID. For example, one set of RBIDs could be assigned to STAs with an assigned RBID, while another set of RBIDs could be randomly selected by the STAs. In one embodiment, a trigger frame includes information per set of RBIDs. The per-STA or per user info field of a conventional MAC frame can be reused for this purpose or a new field may be defined which can be a per-RBIDs_set info field in case of short feedback trigger frame type. FIG. 15 illustrates a per-RBIDs_set info field 93 that would carry: 1) information to define the set of RBIDs such as a min RBID field and max RBID field to define the set as being all RBIDs between the min and max RBID values, 2) information as to whether the set of RBIDs are used for STAs with assigned RBIDs or that can be randomly selected or not, and 3) a groupID field that indicates which group of STAs can participate such that, if set to a default specific entry, all STAs can participate.

Additional Notes and Examples

In Example 1, an apparatus for a wireless access point (AP), the apparatus comprises: memory and processing circuitry, wherein the processing circuitry is to: encode a medium access control (MAC) layer short feedback trigger frame to request a short feedback response from one or more stations (STAs) wherein the short feedback trigger frame includes a feedback type field that indicates a type of feedback that is to be elicited from the one or more STAs; and, decode short feedback responses from the one or more STAs where the short feedback response from a particular STA is encoded as energy or lack thereof in one or more high-efficiency long training fields (HE-LTFs) of a physical layer packet in a particular resource block (RB) identified by a resource block identification (RBID) assigned to the particular STA that defines a particular resource unit (RU) and particular spatial stream (SS).

In Example 2, the subject matter of any the Examples herein may optionally include wherein the feedback type field indicates a feedback type selected from a group that includes a resource request, a power save (PS) poll where a STA in PS mode polls the AP to determine if has buffered downlink (DL) traffic for the STA, or a location service measurement request.

In Example 3, the subject matter of any the Examples herein may optionally include wherein the short feedback trigger frame includes an indication in a trigger type field that short feedback is requested.

In Example 4, the subject matter of any the Examples herein may optionally include wherein the short feedback trigger frame includes a group identification (groupID) field that indicates which STAs are to respond to the short feedback request.

In Example 5, the subject matter of any the Examples herein may optionally include wherein the groupID field includes a value that allows all STAs with a previously assigned RBID to respond or a value that allows only STAs belonging to a particular group to respond, wherein the group is identified by an RBID set containing particular RBID values.

In Example 6, the subject matter of any the Examples herein may optionally include wherein the short feedback trigger frame includes one or more per-RBIDs_set info fields that each contain information to define a set of RBIDs and information as to whether the set of RBIDs are to be used for STAs with assigned RBIDs or can be randomly selected by a STA without a pre-assigned RBID.

In Example 7, the subject matter of any the Examples herein may optionally include wherein the per-RBIDs_set info fields includes a min RBID field and a max RBID field to define the set of RBIDs as being all RBIDs between the minimum and maximum RBID values contained in the min and max RBID fields.

In Example 8, the subject matter of any the Examples herein may optionally include wherein the short feedback trigger frame includes an indication of the number of bits to be transmitted in the short feedback as a corresponding number of LTFs.

In Example 9, the subject matter of any the Examples herein may optionally include wherein the short feedback trigger frame includes a rotation value by which a STA calculates an effective RBID as a function of its previously assigned RBID.

In Example 10, the subject matter of any the Examples herein may optionally include wherein the processing circuitry is to demodulate HE-LTFs in multi-user null data packets (MU-NDPs) transmitted by STAs responding to the short feedback request.

In Example 11, an apparatus for a wireless station (STA), the apparatus comprises: memory and processing circuitry, wherein the processing circuitry is to: decode a medium access control (MAC) layer short feedback trigger frame from an access point (AP) that requests a short feedback response, wherein the short feedback response is to be encoded as energy or lack thereof in one or more high-efficiency long training fields (HE-LTFs) of a physical layer packet in a particular resource block (RB) identified by a resource block identification (RBID) assigned to the STA that defines a particular resource unit (RU) and particular spatial stream (SS); and, encode the short feedback response in a multi-user null data packet (MU NDP).

In Example 21, the subject matter of any of the Examples herein may optionally include a radio transceiver having one or more antennas connected to the processing circuitry.

In Example 22, a computer-readable medium contains instructions to cause a wireless station (STA) or access point (AP), upon execution of the instructions by processing circuitry of the STA or AP, to perform any of the functions of the processing circuitry as recited by any of the Examples herein.

In Example 23, a method for operating a wireless station or access point comprises performing any of the functions of the processing circuitry and/or radio transceiver as recited by any of the Examples herein.

In Example 24, an apparatus for a wireless station or access point comprises means for performing any of the functions of the processing circuitry and/or radio transceiver as recited by any of the Examples herein.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplate are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The embodiments as described above may be implemented in various hardware configurations that may include a processor for executing instructions that perform the techniques described. Such instructions may be contained in a machine-readable medium such as a suitable storage medium or a memory or other processor-executable medium.

The embodiments as described herein may be implemented in a number of environments such as part of a wireless local area network (WLAN), 3rd Generation Partnership Project (3GPP) Universal Terrestrial Radio Access Network (UTRAN), or Long-Term-Evolution (LTE) or a Long-Term-Evolution (LTE) communication system, although the scope of the disclosure is not limited in this respect. An example LTE system includes a number of mobile stations, defined by the LTE specification as User Equipment (UE), communicating with a base station, defined by the LTE specifications as an eNodeB.

Antennas referred to herein may comprise one or more directional or omnidirectional antennas, including, for example, dipole antennas, monopole antennas, patch antennas, loop antennas, microstrip antennas or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, antennas may be effectively separated to take advantage of spatial diversity and the different channel characteristics that may result between each of antennas and the antennas of a transmitting station. In some MIMO embodiments, antennas may be separated by up to $1/10$ of a wavelength or more.

In some embodiments, a receiver as described herein may be configured to receive signals in accordance with specific communication standards, such as the Institute of Electrical and Electronics Engineers (IEEE) standards including IEEE 802.11-2007 and/or 802.11(n) standards and/or proposed specifications for WLANs, although the scope of the disclosure is not limited in this respect as they may also be suitable to transmit and/or receive communications in accordance with other techniques and standards. In some embodiments, the receiver may be configured to receive signals in accordance with the IEEE 802.16-2004, the IEEE 802.16(e) and/or IEEE 802.16(m) standards for wireless metropolitan area networks (WMANs) including variations and evolutions thereof, although the scope of the disclosure is not limited in this respect as they may also be suitable to transmit and/or receive communications in accordance with other techniques and standards. In some embodiments, the receiver may be configured to receive signals in accordance with the Universal Terrestrial Radio Access Network (UTRAN) LTE communication standards. For more information with respect to the IEEE 802.11 and IEEE 802.16 standards, please refer to "IEEE Standards for Information Technology—Telecommunications and Information Exchange between Systems"-Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions. For more information with respect to UTRAN LTE standards, see the 3rd Generation Partnership Project (3GPP) standards for UTRAN-LTE, release 8, March 2008, including variations and evolutions thereof.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. An apparatus of an access point (AP), the apparatus comprising: memory; and processing circuitry coupled to the memory, the processing circuitry configured to:
   encode for transmission a trigger frame, the trigger frame comprising a trigger type subfield, the trigger type subfield indicating null data packet (NDP) feedback, and a feedback type subfield, the feedback type subfield indicating a resource request, wherein the trigger frame further comprises an identification, the identification indicating stations (STAs) scheduled to transmit NDP feedback responses to the resource request and indicating resource units (RUs) for the STAs to transmit the NDP feedback responses, the RUs indicating different non-overlapping sets of subcarriers of long-training fields (LTFs);
   configure the AP to transmit the trigger frame; and
   decode NDP physical layer (PHY) protocol data unit (PPDUs) from the STAs, the NDP PPDUs comprising the different non-overlapping sets of subcarriers of the LTFs, the different non-overlapping sets of subcarriers of the LTFs indicating the NDP feedback responses.

2. The apparatus of claim 1, wherein the NDP PPDUs from the STAs are received by the AP simultaneously.

3. The apparatus of claim 1, wherein the trigger frame further comprises a spatial stream subfield, the spatial stream subfield indicating a spatial stream for the RUs.

4. The apparatus of claim 1, wherein the NDP feedback responses comprise one bit that indicates a response to the resource request.

5. The apparatus of claim 4, wherein the one bit is encoded using a set of subcarriers of the different non-overlapping sets of subcarriers of the LTFs.

6. The apparatus of claim 1, wherein the processing circuitry is further configured to encode the trigger frame with a bandwidth subfield, the bandwidth subfield indicating a bandwidth for the NDP feedback responses, wherein a number of STAs scheduled to transmit NDP feedback responses increases with a larger bandwidth.

7. The apparatus of claim 1, wherein the trigger frame initiates a multi-user (MU) uplink (UL) transmission.

8. The apparatus of claim 1, wherein the trigger frame further comprises a number of LTFs subfield, the number of LTFs subfield indicating four LTFs.

9. The apparatus of claim 1, wherein the processing circuitry is further configured to:
   determine which STAs have data for uplink transmission based on the NDP feedback responses.

10. The apparatus of claim 1, wherein the NDP feedback responses comprise a 1 or −1 transmitted on a set of subcarriers of the different non-overlapping sets of subcarriers of the LTFs to indicate a 1 or a 0 in response to the resource request.

11. The apparatus of claim 1, wherein the LTFs are high-efficiency (HE) LTFs and the NDP PPDUs are HE NDP PPDUs.

12. The apparatus of claim 1, wherein the identification is a STA identification.

13. The apparatus of claim 1 further comprising: mixer circuitry to downconvert RF signals to baseband signals; and synthesizer circuitry, the synthesizer circuitry comprising one of a fractional-N synthesizer or a fractional N/N+1 synthesizer, the synthesizer circuitry configured to generate an output frequency for use by the mixer circuitry, wherein the processing circuitry is configured to decode the baseband signals, the baseband signals including the NDP PPDUs.

14. The apparatus of claim 1 further comprising: mixer circuitry to down-convert RF signals to baseband signals; and synthesizer circuitry, the synthesizer circuitry comprising a delta-sigma synthesizer, the synthesizer circuitry configured to generate an output frequency for use by the mixer circuitry, wherein the processing circuitry is configured to decode the baseband signals, the baseband signals including the NDP PPDUs.

15. The apparatus of claim 1, further comprising: transceiver circuitry coupled to the processing circuitry; and, one or more antennas coupled to the transceiver circuitry, and wherein the memory is configured to store the trigger frame.

16. A non-transitory computer-readable storage medium that stores instructions for execution by one or more processors of an access point, the instructions to configure the one or more processors to:
   encode for transmission a trigger frame, the trigger frame comprising a trigger type subfield, the trigger type subfield indicating null data packet (NDP) feedback, and a feedback type subfield, the feedback type subfield indicating a resource request, wherein the trigger frame further comprises an identification, the identification indicating stations (STAs) scheduled to transmit NDP feedback responses to the resource request and indicating resource units (RUs) for the STAs to transmit the NDP feedback responses, the RUs indicating different non-overlapping sets of subcarriers of long-training fields (LTFs);
   configure the AP to transmit the trigger frame; and
   decode NDP physical layer (PHY) protocol data unit (PPDUs) from the STAs, the NDP PPDUs comprising the sets of subcarriers of the LTFs, the sets of subcarriers of the LTFs indicating the NDP feedback responses.

17. The non-transitory computer-readable storage medium of claim 16, wherein the NDP PPDUs from the STAs are received by the AP simultaneously.

18. An apparatus of a station (STA), the apparatus comprising: memory; and processing circuitry coupled to the memory, the processing circuitry configured to:

decode a trigger frame, the trigger frame comprising a trigger type subfield, the trigger type subfield indicating null data packet (NDP) feedback, and a feedback type subfield, the feedback type subfield indicating a resource request, wherein the trigger frame further comprises an identification, the identification indicating stations (STAs) scheduled to transmit NDP feedback responses to the resource request and indicating resource units (RUs) for the STAs to transmit the NDP feedback responses, the RUs indicating sets of subcarriers of long-training fields (LTFs);

in response to the identification indicating the STA is scheduled, determine a NDP feedback response, encode for transmission the NDP feedback response in a corresponding set of subcarriers of an LTF of the sets of subcarriers of the LTFs, and encode a NDP physical layer (PHY) protocol data unit (PPDUs) to comprise the set of subcarriers of the LTF, and configure the STA to transmit the NDP PPDU.

19. The apparatus of claim 18, wherein the NDP feedback response comprises one bit that indicates a response to the resource request.

20. The apparatus of claim 18, further comprising: transceiver circuitry coupled to the processing circuitry; and, one or more antennas coupled to the transceiver circuitry, and wherein the memory is configured to store the trigger frame.

* * * * *